3,055,867
METALLIC TIN AS A CATALYST IN THE PREPARATION OF POLYESTERS BY REACTION OF A POLYOL AND A POLYCARBOXYLIC ACID
Louis R. Le Bras, Pittsburgh, and Donald F. Stahr, Arnold, Pa., assignors to Pittsburgh Plate Glass Company, a corporation of Pennsylvania
No Drawing. Filed Mar. 31, 1959, Ser. No. 803,084
5 Claims. (Cl. 260—75)

This invention relates to the preparation of polymeric polyesters such as are employed as hydroxy-containing components in polyurethane resins, used in coatings and in foams such as are employed as thermal insulators, as cushioning members, as buoyancy elements, as potting resins and for various other applications, and it has particular relation to the use of metallic tin or an alloy thereof as a catalyst in the preparation of such polyesters by direct condensation reaction of a polyol and a polycarboxylic acid or polycarboxylic acid anhydride.

Reactions of esterification involved in the preparation of such polyesters as are employed in the preparation of polyurethane resins or as potting resins, and for other purposes, may be effected by heating a mixture of a dicarboxylic acid (or its anhydride) with a polyhydric alcohol such as glycol, glycerol or a polymethylol compound. Esterification will take place even in the absence of catalysts. However, the reaction requires a long time, e.g., 16 or 18 hours, to obtain acid numbers of 3 or less. For this reason, it is usually preferred to incorporate into the reaction mixture a catalyst, of which p-toluenesulfonic acid is a classic example and the one heretofore most commonly used. While this material effectively reduces cooking time for the esterifiable mixture, the prior art techniques of cooking polyesters then are attended by serious objectionable features such as:

(A) There is a tendency to discolor the product, water-white esters being substantially impossible to obtain by this method.

(B) It is difficult to obtain polymeric polyesters, the molecules of which are substantially completely terminated by hydroxyls and which, therefore, are of low acid value. If no catalyst is used, long cooks or high temperatures are required if an acid number below 10 is to be obtained. If paratoluene sulfonic acid is added to the reaction mixture, it is possible to attain an acid number as low as 3 or even 2½, in about 6 to 6½ hours. Usually, however, it is necessary to employ about a 10 percent excess of the glycol component, if polyesters of low acid number are to be obtained with p-toluenesulfonic acid as a catalyst.

(C) Another objection to p-toluenesulfonic acid as a catalyst resides in the fact that quite substantial amounts, e.g., about 0.1 to about 0.5 percent by weight based upon the reaction charge, is usually required.

(D) Still another serious objection to polyesters prepared by use of p-toluenesulfonic acid as a catalyst resides in the fact that the polyesters obtained possess poor stability in the presence of moisture and at elevated temperatures.

In United States Patent 2,720,507 to J. R. Caldwell, it is disclosed that certain compounds of tin, containing alkali metal or alkaline earth metal groups or hydrocarbon groups attached directly to the metal, are effective catalysts of the ester interchange between esters of monohydric alcohols and certain complex polycarboxylic acids, to form polyesters. A necessary condition in this use of tin compounds, containing hydrocarbon groups attached directly to the metal as disclosed in the patent, resides in the fact that water must be kept from the reaction zone. This, of course, would seem to preclude the use of these compounds in direct esterification between the polyol and a polycarboxylic acid or the anhydride thereof, since the latter types of reaction are inherently attended by the evolution of considerable amounts of water.

This invention is based upon the discovery that metallic tin and alloys thereof constitute efficient catalysts of direct esterification reaction between polycarboxylic acids (or anhydrides thereof) and polyols, and the evolved water does not adversely affect the reaction. The term "tin" as used herein, also includes the alloys of tin, especially those which are rich in tin and contain 50 percent by weight or more thereof.

Important advantages of the use of metallic tin, or an appropriate alloy containing the same, in the esterification reaction may be listed as follows:

Very fast cooks of the esterification mixture at moderate temperatures can be obtained;

Very low acid values, e.g., of 2 or even less, are very readily obtained in the cooking operation even when practically theoretical amounts of a polyol are employed, and acid values of about 1 can be obtained with a polyol excess of 3 percent, or even less;

The color of the polyesters obtained when a metallic tin is used as a catalyst is excellent, it being quite possible to obtain polyesters often in a nearly water-white state;

Polyesters of very high hydrolytic stability may be formed.

Still another important feature of this invention resides in the discovery that when metallic tin is used as a catalyst, the color of the product can be still further improved by treating said product with a small amount (about 0.01 to about 1 percent by weight based upon the mixture) of an adsorbent agent, such as adsorbent carbon black. Such treating agents may be filtered off at the end of the reaction with the aid of diatomaceous earth, leaving a beautifully clear polyester.

It will be apparent that the metallic tin herein disclosed, may be employed in the esterification of a great many polycarboxylic acids and a great many polyols. In performing the esterification reaction, the acids or anhydrides thereof (where anhydrides exist) may be used, and the ultimate polyesters are the same regardless of whether the dibasic acid or its anhydride is employed. The term "acid" as used herein, therefore, is often intended to include either the acid or the free anhydride thereof.

Polyesters of the following representative polycarboxylic acids may be prepared:

| | |
|---|---|
| Dimer acids [1] | Oxalic acid |
| Adipic acid | Sebacic acid |
| Succinic acid | Azelaic acid |
| Phthalic acid | Isosebacic acid |
| Isophthalic acid | Fumaric acid |
| Terephthalic acid | Malic acid |
| Diglycolic acid | Glutaric acid |
| Maleic acid | Diphenic acid |

[1] The term "dimer acids" as employed herein, comprises those acids containing a plurality of carboxyls and which result through Diels-Alder ethylenic reaction of drying oil acids such as linoleic acid or linolenic acid, or mixtures of the two in well-known manner.

Mixtures of any two or more of the acids are contemplated. In such mixtures, any one of the acids may be used in an amount ranging from about 1 to about 50 molar percent of the mixture.

The foregoing list of acids, it is to be emphasized, is but illustrative and therefore but partial. Manifestly, many other polycarboxylic acids may also be employed if so desired.

Likewise, the principles of the present invention are applicable to the use of a relatively wide range of polyols. Some of these usually are glycols, of which the following constitutes a partial list from which selection can be made:

| | |
|---|---|
| Ethylene glycol | 1,4-butane diol |
| Propylene glycol | 1,5-pentane diol |
| Diethylene glycol | Trimethylene glycol |
| Dipropylene glycol | Polyethylene glycol |
| Triethylene glycol | Polypropylene glycol |
| Neopentyl glycol | |

Mixtures of any two or more of these diols are included.

Often, the glycols above enumerated are mixed with, or replaced by appropriate amounts of a polyol containing 3 or more (e.g. up to 6) hydroxyl groups and being represented by:

| | |
|---|---|
| Trimethylol ethane | Pentaerythritol |
| Trimethylol propane | Sorbitol |
| Glycerol | Methyl glycoside |
| 1,2,6-hexanetriol | Mannitol |

The diol and polyol components are employed in an amount theoretically to react with all carboxyls and to give hydroxyls imparting desired hydroxyl values (e.g. 40 to 700) to the polyester.

Usually, though not always, the reaction is also conducted in the presence of an appropriate nonreactive liquid diluent, which may be selected to provide a constant boiling mixture with the water evolved in the reaction, but being insoluble in water. Such diluents facilitate the removal of water from the reaction zone and thus cause the reaction to go in the desired direction. Appropriate diluents of this type comprise liquid aromatic hydrocarbons such as are used as diluents in esterification reactions to form polyesters. However, it is an advantage of metallic tin as a catalyst, that it can also be used with effect in fusion cooks in the absence of liquid diluents.

The forms of metallic tin from which selection can be made in the catalysis of the esterification reaction between polycarboxylic acids and polyols of the foregoing types, include such materials as:

| | |
|---|---|
| Mossy tin | Tin shot or beads |
| Diced tin | Tin foil |
| Tin filings | Pulverulent tin |
| Tin turnings | |

Alloys of tin and other metals such as antimony, copper, zinc, cadmium, bismuth, lead, mercury and other metals, are also included. The alloys may be binary, ternary or quaternary. Those alloys containing from about 50 to about 90 percent by weight of tin, the rest being one or more of the foregoing metals, are preferred. Commercial forms of these metals are sold as soft solder (lead and tin), Brittania metal (tin and antimony), pewter and Babbitt metal. The catalyst may be added to the esterifiable mixture of dicarboxylic acid and polyol as powders, shot, chips, or in other form, in an amount to provide an adequate amount of tin to promote the reaction. Even tin plate can be used.

The metallic tin is often fused down during the cook and can be recovered almost completely and in metallic form. It seems to be temporarily deactivated when so used, but recovers its activity if exposed to the air for a while, e.g., a week or longer.

It is an important advantage of the present invention that the metallic tin employed as the catalyst of esterification, may be employed in minimal amounts in percentages, e.g., in a range of about 0.001 to about 1.0 percent by weight based upon the mixture. However, higher amounts are also effective, though unnecessary and in general, are not preferred. In any event, the amount of catalyst is relatively small as compared with the total volume of material to be treated.

In conducting the esterification reaction contemplated by this invention, any convenient form of esterification apparatus may be employed; for example, it may assume the form illustrated in the copending application of Carl C. Georgian and Robert A. Wavering, Serial No. 418,140, filed March 23, 1954. In those instances in which the polyol component tends to be volatile and to escape from the reaction zone, recovery procedures such as disclosed in the foregoing application, are applicable.

The glycol recovery process of said application, also applicable in this case, comprises cooking in a kettle, a mixture of a polyol such as propylene glycol, and a dicarboxylic acid (or its anhydride) such as a mixture of maleic anhydride and adipic acid, or phthalic anhydride dissolved in a solvent such as xylene. The vapors from the kettle, including water of reaction, some vapors of glycol and solvent are passed through a glycol recovery column, in the top of which they are washed with water at a temperature approximately corresponding to that of boiling of a constant boiling mixture of solvent and water. The glycol is thus washed from the vapor mixture and returns down the column to the kettle. The vapors of solvent and water in the proportions of a constant boiling mixture, pass over, are condensed, and are separated.

In conducting the reaction in said apparatus, but with metallic tin or an alloy thereof as a catalyst, the reactants are introduced in about 5 to 15 percent of a nonreactive solvent designed to form a constant boiling mixture with water. The vapors from the mixture remove water from the zone of reaction. Appropriate media include xylene, toluene and benzene already referred to, and other solvents which do not enter into the reaction, which form constant boiling mixtures with water and which are insoluble in water.

The use of apparatus and techniques of the foregoing patent application, is an optional refinement. In many instances, polyol recovery from the reaction vapors from the kettle is not required and in that event, the diluent is simply distilled to remove water of reaction from the reaction zone. The diluent after condensation and separation of water, can be recirculated.

As already stated, it is an advantage of the present invention that the reaction mixture can easily be cooked to a very low acid value, for example, below 3 and usually below 1. Therefore, if evaporational losses are prevented, it seldom is necessary to employ any great excess of polyol component beyond that which is actually used up in the reaction in the esterification of the carboxyls and in the provision of terminal hydroxyls on the polyester chains. A 3 percent or even smaller, excess is usually sufficient, though higher percentages, for example, 5 percent or more, may be employed if so desired, but usually, do not favor economy of operation.

In those instances in which the reaction is employed to provide polyesters containing hydroxyls, adapting them for reaction with a diisocyanate such as tolylene diisocyanate, to form polyurethane resins, tailoring of the polyesters to meet particular requirements may be necessary. Those polyesters employed in the formation of more soft and flexible types of polyurethane foams generally comprise relatively long chains of alternating polyhydric alcohol residues and polycarboxylic acid residues, the terminal units being the polyhydric alcohol or polyol component and the intermediate portion of the chains comprising polycarboxylic acid and polyhydric alcohol components in alternation. Even in the polyesters used to form soft foams, some branching of the chain is usually provided by inclusion of a small amount of a polyol containing 3 or more hydroxyls, in which instance, hydroxyls dispersed at intervals along the chain as a backbone may occur. Due to the type of polyester, a relatively large number of the glycol and polycarboxylic components will occur in the chain; usually, the chain averages about 10 to about 20 or more, of each of the residues. These polyesters are usually of comparatively low hydroxyl value, as well as low acid value. For the highly flexible foams, the hydroxyl value ordinarily will be in a range of about 40 to about 75.

In order to obtain polyesters useful for the preparation of rigid-type foams, it is desirable to increase the content of polyol containing 3 or more hydroxyls as compared with the diol content. The resultant polyesters are of relatively short chain lengths, seldom containing more than 5 polyol units in any given length, and are characterized by a higher degree of branching, thus proportionally providing a great many more termini for hydroxyl groups. Owing to the branching, several chains, each comprising about 1 to 5 polyol units per molecule, may occur. These polyesters usually are of relatively high hydroxyl value, e.g., 200 or more. Of course, it is also contemplated to tailor the polyesters in such manner as to provide for the formation of foams of intermediate hardness. Cooking of the polyesters is continued until the acid value has dropped to a point commensurate with the requirements of the application to which the material is to be put, usually to a range below 3, often to nearly zero. This capacity for carrying the polyesters to such low acid values smoothly and quickly without the use of large excesses of polyol, is unusual in catalysts.

The use of metallic tin in the preparation of polyesters suitable for use in the manufacture of polyurethane foams is illustrated by the following examples.

EXAMPLE I

A polyester is prepared from a mixture comprising:

| | Moles |
|---|---|
| Adipic acid | 10.0 |
| Diethylene glycol | 10.3 |
| Trimethylol propane | 0.55 |

The foregoing mixture is catalyzed with about 0.05 to about 1.0 percent by weight based upon the total mixture, of metallic tin in appropriate form. Xylene is employed as a reflux medium and may be used in an amount of about 5 to about 15 percent.

In this and similar runs with various forms and amounts of metallic tin as catalysts, the following apparatus and techniques may be employed:

The reaction apparatus comprises a container which, for laboratory work, may be a three-necked flask of appropriate size, the flask being equipped with a stirrer, a packed column, a thermometer, an inlet for inert gas, and appropriate means for applying heat.

The upper extremity of the column is connected to a condenser, which is connected to a separator designed for separating the condensed water and solvent phases from the column. The water is drawn off and discharged, while the solvent phase is returned to the reaction zone through the column, or directly by an appropriate line to the reaction flask. The evolution of water constitutes a criterion of esterification reaction and the quantity may be measured during the course of the reaction to determine the approximate stage of the reaction. When water ceases to evolve, the reaction can be regarded as being substantially complete.

It is also desirable that the reaction flask be equipped with a line for the introduction of inert gas, such as carbon dioxide, fuel gas or nitrogen, below the surface of the reaction mixture, and being designed to provide a blanket for the reaction and also at the appropriate stage, being designed to sweep out solvents and evolved water from the reaction zone.

In conducting the reaction, the metallic tin or its alloy, may be added initially, or it may be added subsequently to the mixture as esterification progresses. Either method is effective. Tin may also be added in several portions as the cook progresses, to give more uniform catalysis throughout the reaction.

In conducting the reaction, the heat may be placed initially at maximum in order promptly to melt all of the solid materials. Stirring is started as soon as practicable in order to promote heating and melting. The inert gas blanket is introduced into the reaction vessel when the mixture has fused.

Initially, the reaction may be run either as a solvent or fusion cook. It is convenient to carry the cook to a temperature between about 170° C. and about 250° C. and at this point, the separator trap is filled with solvent and additional solvent is added to the batch to establish reflux. Either toluene or xylene is effective as a solvent. The reaction mixture in the flask may be held at temperature of about 195° to an acid number of 15 or 20, or in some instances, the foregoing temperature may be held until an acid number as low as 2.5 is attained. In other instances, in order to attain the latter acid value, cooking is continued to a temperature of 220° C. to 240° C. Cooking is usually completed in about 4.2 hours. Blowing with inert gas is employed at the end of the reaction to remove solvents and to strip off any traces of water not already removed.

Preferably, blowing is continued until a Gardner-Holdt bubble test indicates a viscosity of Z5+¼ at 100 percent solids. Cooling and filtering of the product completes the preparation.

The tin is nearly all recovered as a button-like body at the conclusion of the reaction. The tin may be cut up and after aging for a few days, e.g., a week or longer, can be reused.

The principal data determined on each batch were: the time required to reach an acid number of 2.5 (which is taken as the time of cook), color (APHA and Gardner) and hydrolytic stability. The hydrolytic stability is defined as the change in acid number of a resin sample after exposure to 158° F. under an atmosphere of 90 to 100 percent relative humidity for 24 hours. These were determined the following day after preparation of the resin.

Certain pertinent data of a series of resins, as prepared by the foregoing techniques and in which tin in certain forms and in varying proportions was used as a catalyst, are tabulated as follows:

Table I

| Form | Conc., percent | Time, Hours | Temp., °C. | Solvent | Color Gard. | Color APHA | Hydrolytic Stability | Comments |
|---|---|---|---|---|---|---|---|---|
| 30 mesh | 0.05 | 5.3 | 200 | Xylene | −1 | 145 | 0.18 | Fast cook; good color. |
| Do | 0.05 | 4.0 | 220 | do | −1 | 125 | 0.13 | Fast cook; very good color. |
| Do | 0.05 | 3.3 | 240 | do | 1–2 | 230 | 0.02 | Fast cook; fair color. |
| Do | 0.10 | 4.6 | 200 | do | −1 | 140 | | Fast cook; very good color. |
| Do | 0.10 | 3.4 | 220 | do | −1 | 140 | | Do. |
| Do | 0.10 | 3.1 | 240 | do | −1 | 160 | 0.28 | Do. |
| Do | 0.3 | 5.3 | 200 | do | −1 | 135 | 0.01 | Very fast cook; good color. |
| Do | 0.3 | 3.5 | 220 | do | −1 | 145 | 0.29 | Fast cook; very good color. |
| Do | 0.3 | 3.3 | 240 | do | 1–2 | 235 | 0.18 | Fast cook; good color. |
| Do | 1.0 | 8.5 | 175 | do | −1 | 145 | 0.01 | Very fast cook; fair color. |
| 20 mesh | 0.1 | 3.4 | 220 | do | −1 | 140 | 0.29 | Medium cook; good color. |
| Do | 0.05 | 3.5 | 220 | do | −1 | 155 | 0.25 | Fast cook; very good color. |
| Fine powder | 0.10 | 2.7 | 220 | do | −1 | 180 | | Fast cook; good color. |
| Do | 0.05 | 3.6 | 220 | do | 1–2 | 260 | 0.27 | Very fast cook; good color. |
| Shot | 0.1 | 4.2 | 220 | do | 1–2 | 220 | 0.17 | Fast cook; fair color. |
| Foil | 0.1 | 3.7 | 220 | do | 1–2 | 240 | | Do. |
| Mossy | 0.1 | 4.0 | 220 | do | −1 | 155 | | Do. |
| Control | [1] 0 | 5.2 | 195 | Toluene | 3–4 | 275 | 14.1 | Fast cook; good color. Fast cook; poor color. |

[1] 0.1 percent p-toluenesulfonic acid.

Metallic tin in its different forms is obviously highly effective as a catalyst even in minute amounts, and will produce very rapid esterification reactions between various polyols and various polycarboxylic acids or the anhydrides of such acids. The resultant polyester products are of exceptionally low acid value and color, and the stability is high. The polyesters are well adapted for use in forming polyurethane resins and for various other purposes, particularly in those instances where polyesters of low acid value are desirable.

Color is further improved if active carbon black such as Darco, is added to the cook in a small amount, e.g., about 0.1 percent by weight based upon the esterifiable mixture. The carbon black is filtered off at the end of the reaction. Its removal is facilitated if a small amount, e.g., 0.1 to about 2.0, of diatomaceous earth is added about 30 minutes before the product is filtered.

Metallic tin is also useful as a catalyst in the preparation of such polyesters as are represented by the following additional examples.

EXAMPLE II

In this example, dimer acids from linseed oil acids are employed as dicarboxylic acids. The charge comprises:

| | Parts by weight |
|---|---|
| Dimer acids (such as 3065-S from Emery Industries) | 73 |
| Triethylene glycol | 25 |
| Trimethylol ethane | 2 |

Tin in an amount of about 0.001 to about 1 percent is added. The mixture is cooked by fusion to a temperature of about 235° C. and an acid number of about 1, and a hydroxyl number of 50 to 70 are attained. This polyester is well adapted for use in the preparation of flexible grades of polyurethane resin foams and for other purposes.

EXAMPLE III

This example illustrates the preparation of a polyester of high hydroxyl number and being adapted for use in preparing polyurethane resins of rigid type. The charge comprises:

| | Moles |
|---|---|
| Adipic acid | 11.0 |
| Trimethylol propane | 11.8 |
| Diethylene glycol | 5.6 |

Toluene is added to this mixture as a reflux medium at the desired stage. Metallic tin such as tin shot, is added as a catalyst in an amount of about 0.001 to about 1 percent by weight based upon the total charge. The mixture is cooked under reflux with removal of water and with return of toluene, to a temperature of about 195° C. and to an acid value of about 2.5.

EXAMPLE IV

This example illustrates the cooking of a polyester charge by the fusion method (in the absence of solvent). The charge comprises:

| | Moles |
|---|---|
| Adipic acid | 10.0 |
| Diethylene glycol | 10.6 |
| Trimethylol propane | 0.55 |

The charge is catalyzed with about 0.001 to about 0.1 percent by weight based on the charge of metallic tin in any one of the forms disclosed, and the mixture is cooked to a temperature of about 220° C. or until desired acid value such as 2.5, is attained.

In the foregoing examples, I through IV, adipic acid may be replaced by succinic acid or sebacic acid, or unsaturated dicarboxylic acids such as maleic acid, fumaric acid, itaconic acid, and others. It may also be replaced at least in part, by an acid or anhydride of an aromatic discarboxylic acid such as phthalic, terephthalic, isophthalic, or the like acid or anhydride.

EXAMPLE V

The following constitutes an esterifiable mixture comprising phthalic anhydride as an aromatic dicarboxylic acid:

| | Moles |
|---|---|
| Adipic acid | 2.0 |
| Phthalic anhydride | 1.0 |
| Trimethylol propane | 4.6 |

Metallic tin in an amount of 0.1 percent by weight and 5 to 15 percent by weight, by xylene are added and the mixture is refluxed to an acid number of about 2.5.

The metallic tin may be used in the catalysis of esterification reactions between many types of carboxylic acids and polyols, though as already pointed out, the metallic tin is particularly effective in the catalysis of mixtures of polyols and polycarboxylic acids where rapid cooks and very low acid numbers are desired. The advantages of tin as a catalyst in the cooking of mixtures were high acid number of the final product, for example, an acid number above 10 or 20, is desired, are less pronounced though the catalytic effect in the cooking of such mixtures is still present.

Alloys and especialy low-melting alloys, containing substantial amounts, e.g., 50 percent by weight or more, of tin may be used as catalysts in the foregoing examples. Binary alloys of tin and antimony such as occur in Brittania metal, may be used.

EXAMPLE VI

This example is a repetition of Example V, but with a commercial tin-lead solder mixture melting at about 170° C. to about 190° C. as the catalyst. The solder effectively catalyzes the reaction.

We claim:
1. The method of preparing a polymeric polyester by direct esterification reaction which comprises forming a mixture, the reactive components of which consist essentially of (A) a free alcohol containing at least two hydroxyl groups, (B) a carbonyl compound selected from the class consisting of a free dicarboxylic acid and the free anhydride thereof, said alcohol and said carbonyl compound consisting solely of atoms of carbon, hydrogen and oxygen, the alcohol being present in an amount to provide a product of a hydroxyl number between about 40 and about 700, and (C) a catalyst containing about 0.001 to about 1 percent by weight based upon the mixture, of a material selected from the class consisting of free tin metal and metallic tin alloyed with another metal selected from the class consisting of antimony, copper, zinc, cadmium, bismuth, lead and mercury, the alloy containing about 50 to about 90 percent by weight of tin, the alloy being present in the reaction mixture along with free compound (B), and heating the mixture to evolve water and directly to form said polymeric polyester, heating being continued until an acid value below about 20 is obtained.

2. The method of claim 1, in which cooking is continued until an acid value below about 3 is obtained.

3. The method of preparing a polymeric polyester by direct esterification reaction which comprises forming a mixture, the reactive components of which consist essentially of (A) a free alcohol containing at least two hydroxyl groups, (B) a carbonyl compound selected from the class consisting of a free dicarboxylic acid and the free anhydride thereof, said alcohol and said carbonyl compound consisting solely of atoms of carbon, hydrogen and oxygen, the alcohol being present in an amount to provide a product of a hydroxyl number between about 40 and about 700, and (C) a catalyst containing about 0.001 to about 1 percent by weight based upon the mixture, of an alloy of tin and antimony, the alloy containing about 50 to about 90 percent by weight of tin, the catalyst being present in the reaction mixture along with free compounds (A) and (B), and heating the mixture to evolve water and directly to form said polymeric polyester, heating being continued until an acid value below about 20 is obtained.

4. The method of preparing a polymeric polyester by direct esterification reaction which comprises forming a mixture, the reactive components of which consist essentially of (A) a free alcohol containing at least two hydroxyl groups, (B) a carbonyl compound selected from the class consisting of a free dicarboxylic acid and the free anhydride thereof, said alcohol and said carbonyl compound consisting solely of atoms of carbon, hydrogen and oxygen, the alcohol being present in an amount to provide a product of a hydroxyl number between about 40 and about 700, and (C) a catalyst containing about 0.001 to about 1 percent by weight based upon the mixture, of free tin metal, the free tin metal being present in the reaction mixture along with the free compounds (A) and (B), and heating the mixture to evolve water and directly to form said polymeric polyester, heating being continued until an acid value below about 20 is obtained.

5. The method of claim 4 wherein the product is treated with carbon black and the carbon black is then removed to improve the color of the polyester product.

References Cited in the file of this patent

UNITED STATES PATENTS

| | | |
|---|---|---|
| 2,257,384 | Johnston | Sept. 30, 1941 |
| 2,465,319 | Whinfield | Mar. 22, 1949 |
| 2,578,660 | Auspos et al. | Dec. 18, 1951 |